United States Patent [19]
Humphrey et al.

[11] 3,894,186
[45] July 8, 1975

[54] TONE ANALYSIS SYSTEM WITH VISUAL DISPLAY

[75] Inventors: Thomas D. Humphrey, Silberado; John H. Humphrey, Los Angeles, both of Calif.

[73] Assignee: Sound Sciences Inc., Santa Ana, Calif.

[22] Filed: Aug. 30, 1973

[21] Appl. No.: 393,033

Related U.S. Application Data

[63] Continuation-in-part of Ser. No. 299,189, Oct. 20, 1972, abandoned.

[52] U.S. Cl. ................ 179/1 SA; 179/1 D; 84/477
[51] Int. Cl.² ...................... G09B 15/02; G10L 1/00
[58] Field of Search ............. 179/1 SA, 1 SP, 1 D; 84/477, 454; 35/35 C; 324/83 R, 83 A, 83 D

[56] References Cited
UNITED STATES PATENTS

| | | | |
|---|---|---|---|
| 2,181,265 | 11/1939 | Dudley | 179/1 SP |
| 2,646,465 | 7/1953 | Davis et al. | 179/1 SP |
| 2,779,920 | 1/1957 | Petroff | 84/454 |
| 3,180,201 | 4/1965 | Low et al. | 84/477 R |
| 3,384,818 | 5/1968 | Longerich et al. | 324/83 A |

*Primary Examiner*—Kathleen H. Claffy
*Assistant Examiner*—E. S. Matt Kemeny
*Attorney, Agent, or Firm*—Knobbe, Martens, Olson, Hubbard & Bear

[57] ABSTRACT

An audible tone identifier comprises a transducer and amplifier for responding to audible tones, such as generated by a human voice speaking or singing, or a musical instrument, and a plurality of filters sharply tuned to the notes of one or more octaves or fractions thereof of the equal tempered chromatic musical scale or to other patterns of sounds that are to be individually identified. The outputs of the filters are connected to lamp driver circuits which in turn are connected through transposing plug-and-jack connectors and sharp-and-flat insertion switches to lamps on a display board, whereby any musical tone within the range of the device, received by the transducer, will be identified visually on the display board by the lighting of a lamp. The tone identifier may be a component of a teaching or speech therapy system including a source of recorded instructions and sounds to be produced by a trainee, such as a tape player and pre-recorded tape, and headphones through which the trainee hears instructions as well as the sounds produced by him. The relative conformity of tone frequencies with the center frequency of the filters is indicated by comparing the phase of said waves at the input and output of the filters.

3 Claims, 8 Drawing Figures

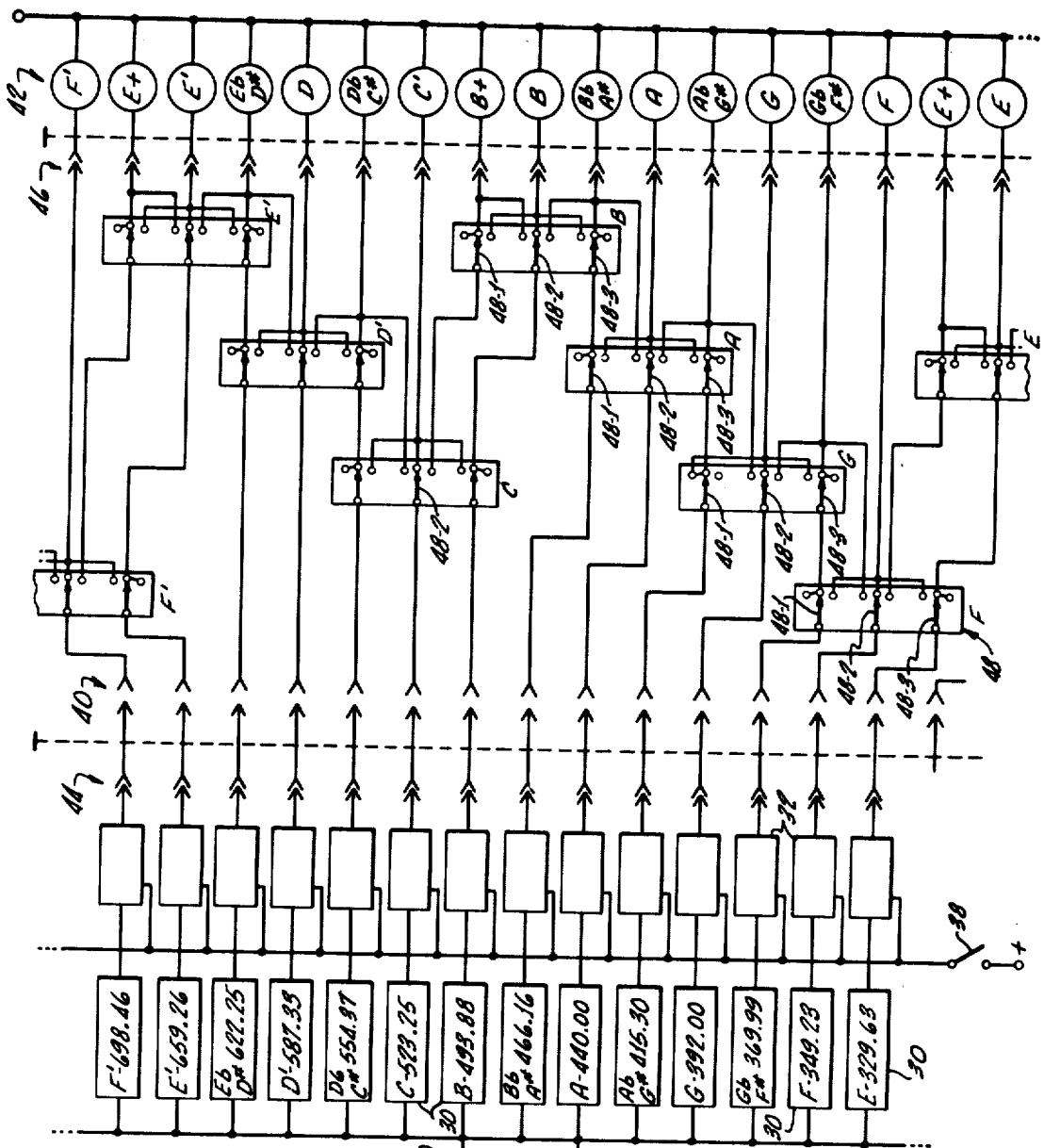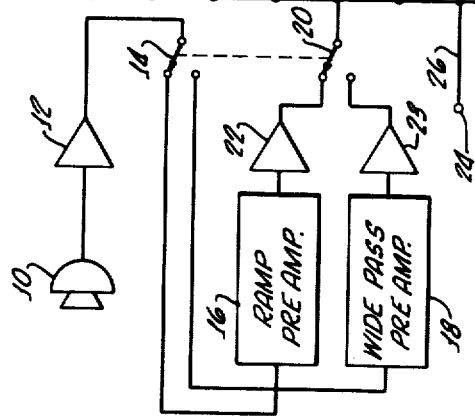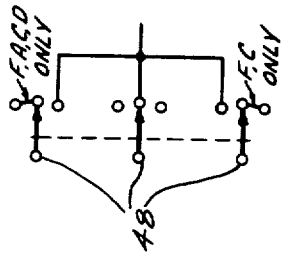
Fig. 1.
Fig. 2.

TONE ANALYSIS SYSTEM WITH VISUAL DISPLAY

RELATED APPLICATION

This application is a continuation-in-part of our application Ser. No. 299,189 filed by us on Oct. 20, 1972, now abandoned.

BACKGROUND OF THE INVENTION

Aids to the teaching of music, whether vocal or instrumental, and for the tuning of instruments have, in the past generally employed one or the other of two concepts. In accordance with one of these concepts of the tone identifying device is comprised of a plurality of tone generators each of which may be individually activated to generate a tone of known frequency. A tone originating in a musical instrument or in the vocal cords of a voice trainee is fed into the device through a microphone and amplifier and is applied to comparison circuitry, such as a cathode ray tube, along with the tone that is being generated as selected within the device. Identification of the tone that is being generated externally and applied to the device is then accomplished through a comparison and matching technique which is at best an indirect method providing no useful output until a match has been accomplished and therefore not giving a direct indication of tone identity nor lending itself readily to the identification of two or more tones simultaneously sounded nor the possibility of a steady and lasting indication of the externally generated tone when the production of that tone has ceased.

The other concept involves the employment in the tone identifying device of a plurality of tuned vibratory elements such as reeds or tuning forks. These are tuned to the frequencies of the notes of the musical scale and are arranged to be set in sympathetic vibration either acoustically or electrically, in response to an externally generated tone that is to be identified and that is introduced into the device through a microphone or other type of transducer. Petroff U.S. Pat. No. 2,779,920, granted Jan. 29, 1957, is an example of an audio-frequency meter employing tuned reeds. A laminated iron core is arranged to influence all of the tuned reeds magnetically and the core carries a winding upon which are impressed the tone signals that are to be identified. In one embodiment the reeds are arranged to serve as light shutters and in another embodiment they are arranged to complete, in their vibratory excursions, the circuits of lamps.

The tone display device employing tuning forks is disclosed in Balamuth U.S. Pat. No. 3,204,513, granted Sept. 7, 1965. In this disclosure tones to be individually identified by the lighting of lamps are applied to a plurality of windings each associated with one of a set of tuning forks to set the tuning fork in vibration at its natural frequency through an iron core associated with the winding. Each tuning fork also has associated with it a pickup coil to be energized at the frequency at which the tuning fork is vibrating. Each of the pickup coils controls a circuit closure device for completing a circuit of a lamp individual to the pickup coil and therefore representing the tuning fork that has been set in vibration.

Tone identifiers employing mechanically vibrating tone identifying components have significant shortcomings. Considering first the problems involved in the employment of reeds, they are likely to be position-sensitive, by which is meant that they may be more responsive to a tone stimulus in one position, such as a vertical position, than they are in another position, such as a vertical position, than they are in anaother position such as a horizontal position. Moreover, minor changes in position, such as due to jarring, or major changes, such as due to tilting of the structure supporting the reeds, is likely to produce erroneous indications. Another disadvantage in the use of vibrating reeds is that they are subject to a hysteresis-like manifestation. The reeds have been found to respond more effectively when activated in an ascending sound spectrum sequence than they do when activated in a descending sequence. Reeds cannot be made to exhibit a high Q, which is a figure of merit related to a factor of rejection of frequencies below and above the frequency that they are intended to pass. Moreover, they cannot be produced practically to exhibit desired values of Q at any frequency.

Reeds have poor dynamic range because sensitivity is limited at the low frequencies and linearity can be achieved only over a very narrow range. The inertia that characterizes mechanical vibratory devices introduces another undesirable effect when those devices are employed as tone responsive components of a tone identifying apparatus, the undesirable effect being that the tone must be sustained until vibration of the reed or fork builds up to useful amplitude. At higher frequencies reeds become very short and the amplitude of displacement becomes so small that operation of light shutters or opening and closing of electrical contacts cannot be accomplished. Moreover, vibratory objects such as reeds are subject to fatigue in the material of which they are made, and the result is that a tone identifier employing reeds that is subjected to substantially constant usage, as in the training of music students or in speech therapy, may require undesirably frequent replacement of reeds. As a corollary of this, electrical contacts used to open and close electrical circuits do not have unlimited useful or effective life, among the limiting factors being wear and other degradation, such as pitting. When the contacts are reeds vibrating at voice frequencies the limit may be reached in a very short time, a matter of a few hours. It is not unusual for electrical contacts to fail after making and breaking a few million times, perhaps 10 million. A vibratory reed tuned to operate 440 cycles per second, which is the frequency of A above middle C in the musical scale, reaches 10 million operations in a few hours.

SUMMARY OF THE INVENTION

In the preferred embodiment of the present invention tones to be identified are impressed upon the tone identifying device by means of a microphone or other transducer, are amplified, shaped and set to an optimum level and are then impressed on the inputs to a plurality of filters. The filters are individually arranged to pass one of the tones of a musical scale, either diatonic or chromatic, of any desired number of octaves or fractions of octaves. The output of each filter is connected to the input of a lamp driver circuit and a control is provided whereby the lamp driver circuits will be activated only as long as a tone is being passed through the associated filter or alternatively will be locked in the activated condition so as to maintain an indication after the tone that has activated the lamp driver circuit has ceased. The outputs of the lamp driver circuits are connected through transposing plug-and-jack combinations to multi-pole, multi-throw sharp-flat matrix switches and thence to lamps located on a display board. With the transposing plug-and-jack sets interengaged in non-transposing relation, and with the sharp-flat matrix switches adjusted to the natural condition of the tones the outputs of the lamp drivers are connected straight through the lamps on the display board, there being a lamp for each filter circuit and lamp driver in the device. Upon the generation of a tone in the vicinity of the microphone the fundamental of the tone, if on pitch, will be passed by one and only one of the filters, the filter that is tuned to that pitch and the associated lamp driver circuit will be activated to cause the lighting of the lamp representing that tone. If the locking control for the lamp driver circuits has been set to lock those circuits when operated the tone indicator lamps will remain lighted after the tones that caused them to be lighted have ceased; otherwise each lamp will be turned off when the tone ceases. If the shaping circuitry provides for the transmission of overtones, other lamps may be lighted in response to harmonics.

Preferably the display board carries a representation of a musical staff comprised of lines and spaces and carrying a clef symbol appropriate to the musical notes that the device is arranged to identify, or alternatively a representation of the black and white keys of a keyboard instrument. The lamps representing the various notes may be contained behind the display board so as to be visible through windows in that board. Because the device includes lamps for the notes in a chromatic scale whereas the lines and spaces of the staff in accordance with the usual musical notation will accommodate only the notes of a diatonic scale, other apertures or windows above and below those for the naturals of the notes may reveal the lamps representing the sharp and flat modifications of the notes involved in diatonic scales other than that of C Major. In the case of a representation of a keyboard, the apertures may be aligned with the corresponding key representations.

The transposing plug-and-jack combinations enable the shifting upwardly or downwardly of all of the lamps on the display board relative to their driver circuits, thereby to render the device useful in connection with transposing types of instruments, such as clarinets, saxophones and some kinds of horns, which the musician manipulates in a mode which he is taught represents the key of C, the instrument sounding, however, in a key other than C and in the case of instruments of a family, such as clarinets or saxophones the instruments of different sizes or ranges sounding in different keys although identically manipulated. The transposing plug-and-jack combinations permit transpositions as between written music and voice ranges necessitating the singing of a composition in a different key.

The sharp-flat matrix switches permit the lamps pertaining to a single natural tone and its sharp and flat variations to be shifted in accordance with a sharp or flat setting of the switch, to aid students in remembering sharp or flat notes called for by the key signature.

In addition to lamps a more precise indication of exact tone production may be provided, in the form of a phase detector common to all of the filters. Inherent in the tone identifying filters is the fact that when the filter passes a tone that matches exactly the resonant frequency of the filter, the signal at the output of the filter is 180° out of phase with the signal applied on the input to the filter. If a tone which is sharp or flat relative to the resonant frequency of the filter is passed through the filter the phase difference will be on one side or the other of 180°. The detector is arranged to indicate deviation as a percentage difference from the resonant frequency.

In addition to usage of the tone identifier alone and purely as a tone display device, it is contemplated that the device may be part of a teaching or voice analysis system which includes as additional components a headset to be used by the subject and a source of recorded lesson or training material, such as magnetic tapes and a tape player. The headset is connected to reproduce the instruction material on the tape including musical notes by name to be voiced by the student into the microphone, or actual tones that the student hears and is instructed to imitate. The tone identifying display panel informs the student as to success or lack of success in following instructions, and the tones voiced by him may be heard through the headphones.

SUMMARY OF MUSICAL SCALE STRUCTURES

Before entering upon a detailed consideration of the preferred embodiment of the invention a background review of musical scales and musical notations may be helpful. Musical scales are generally identified either as diatonic or chromatic. The diatonic scale is divided into octaves, each octave containing seven notes designated by the letters A through G in ascending order, and an eighth note designated by the same letter as the first note of the scale, distinguishable from the first by its location on a musical staff or by a subscript or other distinguishing mark associated with its designating letter and having a frequency which is twice that of its counter-part at the other or lower end of the octave. Beginning with any key designating the note C on a keyboard instrument the diatonic scale in one octave is represented by the next six white keys in ascending order and closing the octave with the key representing the next note C.

The chromatic scale, on the other hand is a twelve note scale comprised of the seven notes in the octave of a diatonic scale and five additional notes which, on a keyboard instrument, are represented by the five black keys intervening some of the white keys in an octave. The interval between any two successive notes in a chromatic scale is generally designated as a semi-tone or half tone. With two exceptions the interval between two successive notes of a diatonic scale is designated as two semi-tones or a whole tone interval, and under that circumstance there is a tone of the chromatic scale intervening the two, which would be the case where there exists a black key between two adjacent white keys on a keyboard instrument. The two exceptions to this pattern are that there is only a semi-tone interval between the notes B and C and between the notes E and F, and this is evidenced by the fact that on a keyboard instrument there is no black key intervening the keys representing and notes B and C and the notes E and F. It follows from this that in any major diatonic scale the intervals between notes expressed by count of semi-tones are two, two, one, two, two, two and one. Another and more usual way of expressing these intervals is that they are designated whole, whole, half, whole, whole, whole and half. Another way of viewing the diatonic scale is that it is comprised of two tetra-chords separated by a whole tone interval and including identical patterns of intervals, namely, whole tone, whole tone, half tone.

The notes of the chromatic scale corresponding to the black keys of a keyboard instrument are designated as sharp or flat relative to the notes of the diatonic scale that they intervene. Thus the note between the notes F and G is designated either as F sharp or G flat, and similarly the note intervening the notes A and B is designated either A sharp or B flat. Because the scale of C Major does not include any of the notes corresponding to the black keys of a keyboard instrument, its key signature in musical notation contains neither sharps or flats. A vocalist singing the scale of C Major calls the tonic note C by the familiar designation "do" and the remaining notes in ascending order as "re","mi","fa", "so", "la", "ti", completing the octave with "do".

Other major scales are derived by the substitution of "black-key" notes of the keyboard instrument for their natural or "white-key" counterparts, and this is accomplished in musical notation by key signatures including one or more sharps or flats. Five sharps or five flats will bring into a major scale all of the black-key notes, and the sharps or flats are used cumulatively in the key signatures. In the case of sharps they are applied cumulatively to the notes F, C, G, D and A and these produce the major scales of G, D, A, E and B respectively. In the major scale beginning with each of these letters the intervals between notes are those hereinbefore mentioned, and for a vocalist singing in any one of these major keys the first note or tonic of the scale, which is the note from which the key derives its name, is identified as "do." There are also key signatures including six and seven sharps and these are applied to the notes E and B, and raise those notes by a semi-tone. Since, as previously stated, the interval between E and F and between B and C is a semi-tone, the tone represented by E sharp is actually the tone of F natural and the tone B sharp is the same as the tone C natural. Looking back at the sequence of addition of sharps it will be noted that the first two sharps eliminate the notes F natural and C natural from the scale, so that no problem arises in later designating these notes as E sharp and B sharp respectively.

Flats all also applied cumulatively to derive other major scales and the sequence of addition of flats is B, E, A, D and G to substitute black-key notes as flattings of their white-key counterparts and thereby derive the major scales having the tonics F, B flat, E flat, and D flat. Sixth and seventh flats added to the first five, and applied to C and F produce major scales beginning on G flat and C flat. As in the case of the sixth and seventh sharps the addition of the sixth and seventh flats results in the flatting of the notes C and F which are only a semi-tone interval above their next lower notes in the scale and the tones sounded for the notes C flat and F flat are the same as the tones for the notes B natural and E natural. Also, as in the case of the sixth and seventh sharps, the first two flats eliminate B natural and E natural from the scales having flats in the key signatures, so that no problem arises in thinking of the notes B natural and as C flat and F flat respectively. It should be understood that the sharps or flats in key signatures merely substitute other notes for naturals and that the scale represented in musical notation by any key signature, whether the key signature contains sharps, flats or neither, is a diatonic scale.

DESCRIPTION OF THE DRAWINGS

For a complete understanding of the invention reference may be had to the following detailed description to be interpreted in the light of the accompanying drawings wherein:

FIG. 1 is a schematic representation of the circuitry of a visual display device in accordance with the present invention;

FIG. 2 is a schematic representation of one of the sharp-flat switches of the device;

DETAILED DESCRIPTION

Figure 3:
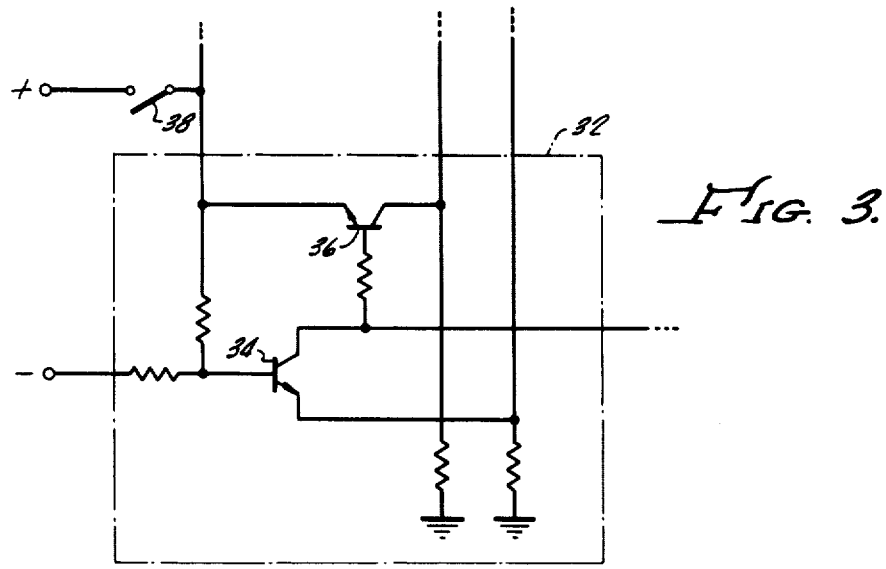
FIG. 3 is a schematic circuit diagram of a lamp driver circuit.

Referring now to the drawings and particularly to FIG. 1 the reference numeral 10 designates a microhphone connected to the input of an amplifier 12, the microphone 10 being provided for responding to sounds from any source, such as the vocal cords of a person or sounds generated by a musical instrument. The output of the amplifier 12 which is represented by the conventional triangular symbol, is connected to a swinger or movable contactor 14 of a double-pole double-throw switch, and the terminals associated with that swinger are connected to the inputs of a ramp preamplifier 16 and a wide pass preamplifier 18. The outputs of the preamplifiers 16 and 18 are connected to the inputs of amplifiers 22 and 23 respectively. The outputs of the amplifiers 22 and 23 are connected to the terminals associated with the swinger 20 of the double-pole double-throw switch and that swinger is connected to the inputs of a plurality of filters to be identified hereinafter. The swingers or contactors 14 and 20 of the switch are ganged to operate together for the purpose of connecting either the ramp preamplifier 16 or the wide pass preamplifier 18 to the plurality of filters.

The characteristic of the ramp preamplifier is that it has a rising attenuation with increasing frequency and its function is to attenuate the harmonics of tones picked up by the microphone 10, so that only the fundamentals of the tones will have levels of sufficient amplitude to register in the tone identifying circuitry that follows. The wide pass preamplifier does not similarly attenuate the harmonics and thus some may have sufficient magnitude to register in the tone identifying circuitry in addition to their fundamentals. The switch comprising the contactors 14 and 20 permits the selective passing of either type of signal.

Figure 5:
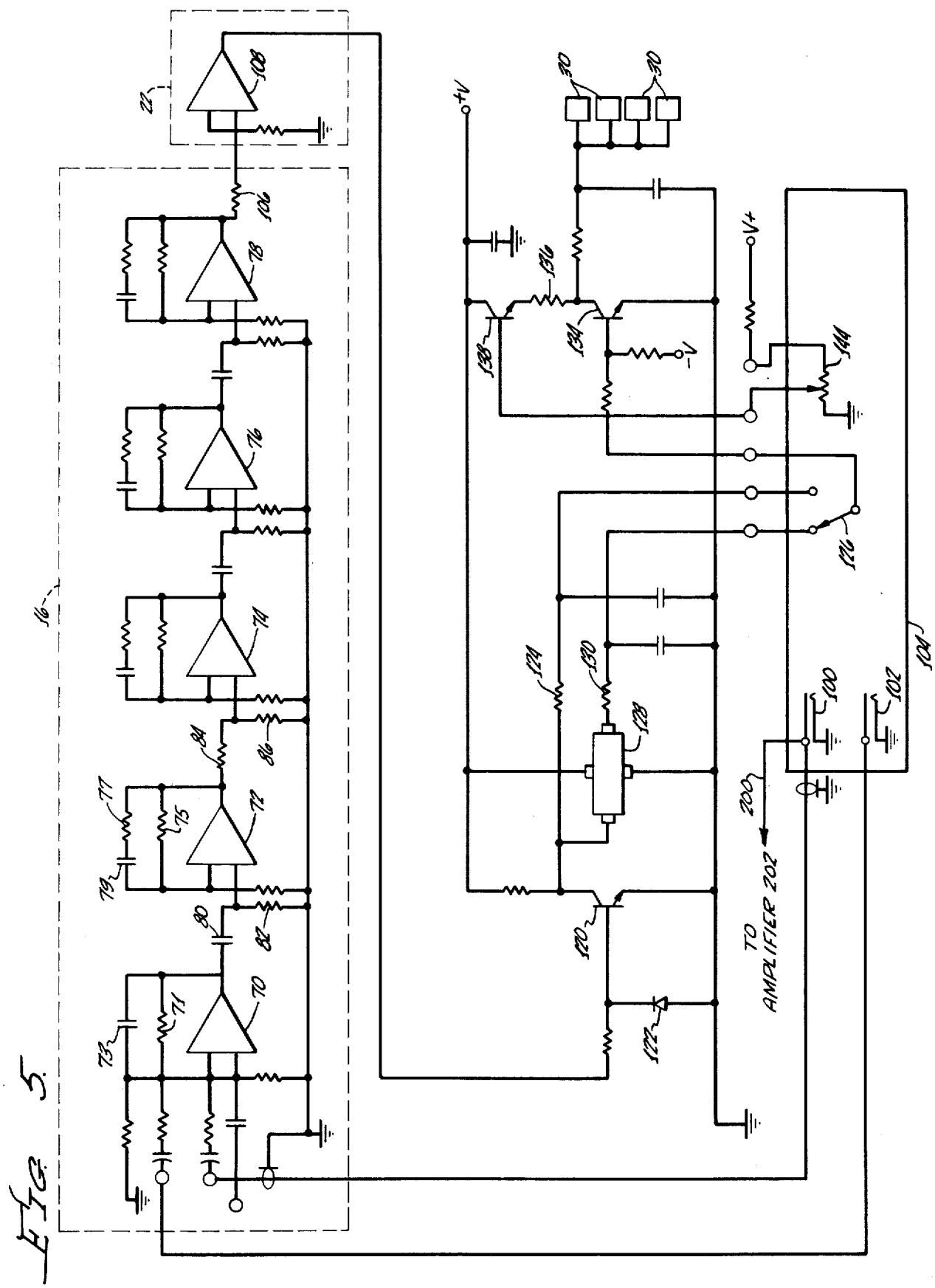
FIG. 5 is a schematic circuit diagram showing the input circuitry of the tone identifier.

The amplifier 22 is preferably a saturated amplifier, operating between saturation and cut-off so as to square the signals impressed upon it and it may include an output level control. The amplifier 23 does not saturate nor cut off, and it may also include an output level control. A schematic circuit drawing of the ramp preamplifier and saturated amplifier, as well as of other component apparatus in accordance with the invention, is shown in FIG. 5 and will be described in detail hereinafter.

Figures 6, 8:
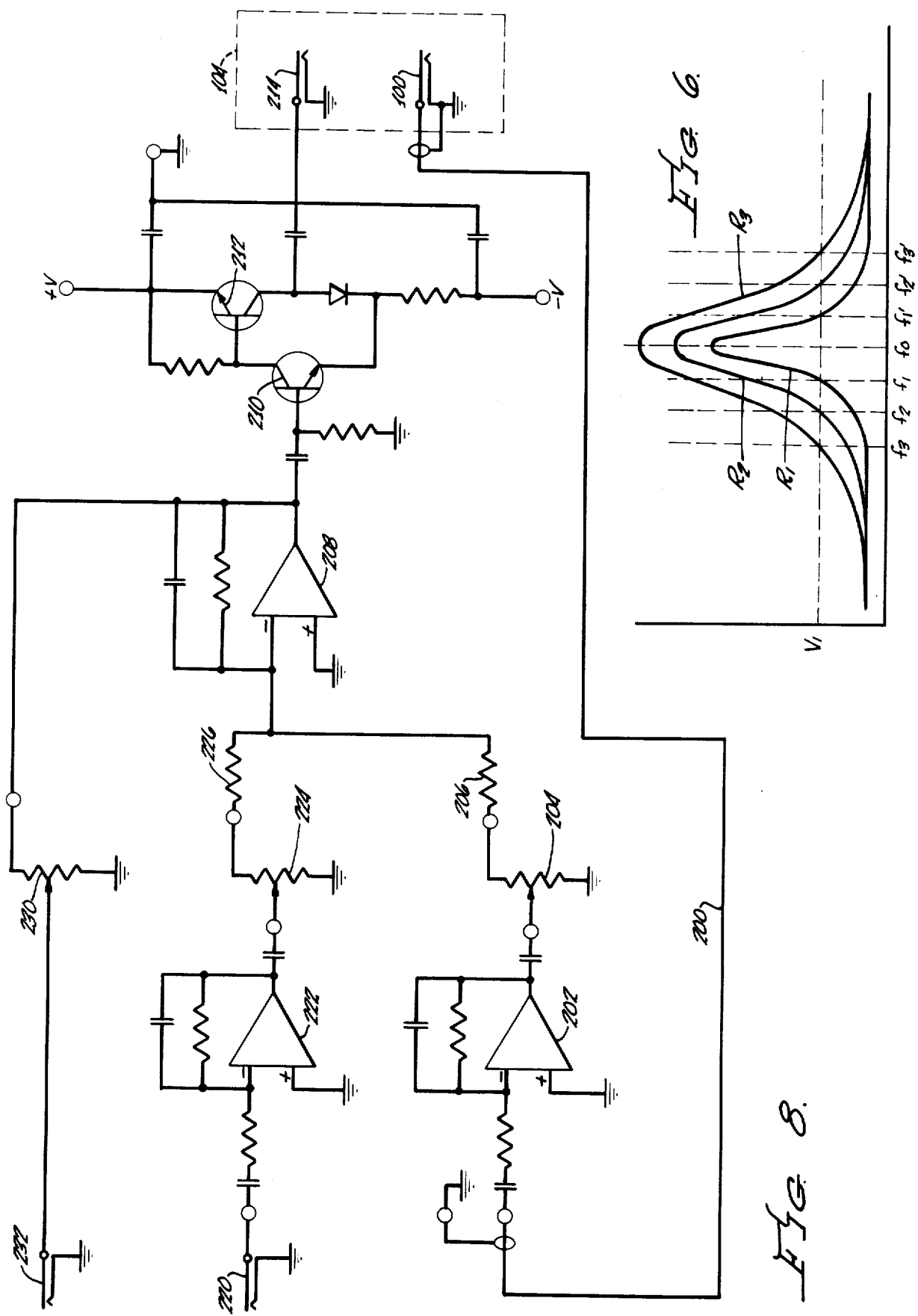
FIG. 6 is a graphical view showing a family of response curves of a typical band pass filter.
FIG. 8 is a schematic circuit diagram showing the circuitry of a teaching and voice analysis system incorporating the tone identifying device.

The swinger 20 of the double pole switch is connected to the input of each of a plurality of filters designated in common by the reference numeral 30 and individually by the musical note that the filter is tuned to pass. In addition there is shown in some of the representations of the filter 30 the actual frequency of the note in accordance with the equal tempered scale, and it will be recognized that the showing in FIG. 1 comprises an octave plus one additional note, that these notes are the ones that in musical notation appear in association with the musical staff bearing the treble clef, and that the filters provide for the handling of the tones of a chromatic scale. It will be understood that there may be provided any number of filters to receive tone signals from the amplifier 22 for a wide spectrum of tones or selected portions of the spectrum, including tones associated with ledger lines and spaces above the treble staff, the tone for middle C associated with a ledger line between the treble and bass staffs in the spectrum and for tones associated with the bass staff. The filters 30 may be of any circuit composition that will afford band pass characteristics of sufficient suppression properties to pass the tone signals that they are intended to pass and to reject the tone signals next above and below in the chromatic musical scale. A form of active band pass filter that is suitable for use as the tone identifying filters in the present invention is a multiple feedback network embodying the teachings of an article entitled "Simple Arithmetic: An Easy Way to Design Active Band Pass Filters" that was published in the June 7, 1971 issue of the publication *Electronics* beginning on page 86 of that issue and ending on page 89, and that published disclosure is incorporated herein by reference as a part of the present specification. Additionally, a schematic circuit drawing of a filter suitable to the accomplishment of the desired result is shown in FIG. 6 and will be described in detail hereinafter.

It will be understood, of course, that "filter" is used here in its generic sense, to designate any type of device that will distinguish among or separate frequencies, including devices operating upon analogue, digital and counting principles, and that there may be fewer filters than display lamps, such as for example, one or more counters each with logic circuitry to select one or another of several lamps for operation depending upon the cumulative count within a given time interval.

The output of each of the filters 30 is connected to the input of a lamp driver circuit 32 which, as shown in FIG. 3 may consist of transistors 34 and 36 having the base of the transistor 34 as the electrode controlled from the band pass filter, the transistor 34 being turned on to effect the lighting of a lamp to be identified hereinafter. The transistor 36 has its base connected to be driven by the transistor 34 and has its collector connectable to operating voltage through a manually operable switch 38 that is common to all of the lamp driver circuits 32. When the switch 38 is open the transistor 36 cannot be turned on and the lamp that is controlled by the transistor 34 will be lighted only as long as the band pass filter that has been activated by a particular tone is receiving that tone. With the switch 38 closed however the transistor 36 will be turned on when the transistor 34 turns on and will in turn hold the transistor 34 turned on after the controlling input to the transistor 34 from its associated tone pass filter 30 has terminated. Thus the lamps may, if desired, be controlled to remain lighted after having been activated, this being accomplished by the closure of the switch 38.

The output leads from the lamp driver circuits 32 are connected to a multi-path plug-and-jack set designated generally by the reference numeral 40 and the paths are then extended to contactors or swingers of sharp-flat insertion control switches in a pattern which will be hereinafter identified. The output leads from the sharp-flat insertion switches are connected on a one-for-one basis, relative to the lamp driver circuits 32, to lamps designated generally by the reference number 42. Additional multi-plug-and-jack sets, designated generally by the reference numerals 44 and 46 may be included in the paths between the lamp driver circuits 32 and the multi-path plug-and-jack set 40, and between the output side of the sharp-flat switches and the lamps 42, so that the device may consist of modules to be interconnected through the multi-path plug-and-jack sets 44 and 46 whereby different arrangements of control circuitry may be connected between the lamp drivers 32 and the lamps 42 as special purposes may dictate. The multi-path plug-and-jack set 40, however, has as its function the transposing of the lamps 42 with respect to the lamp driver circuits 32.

Figure 4:
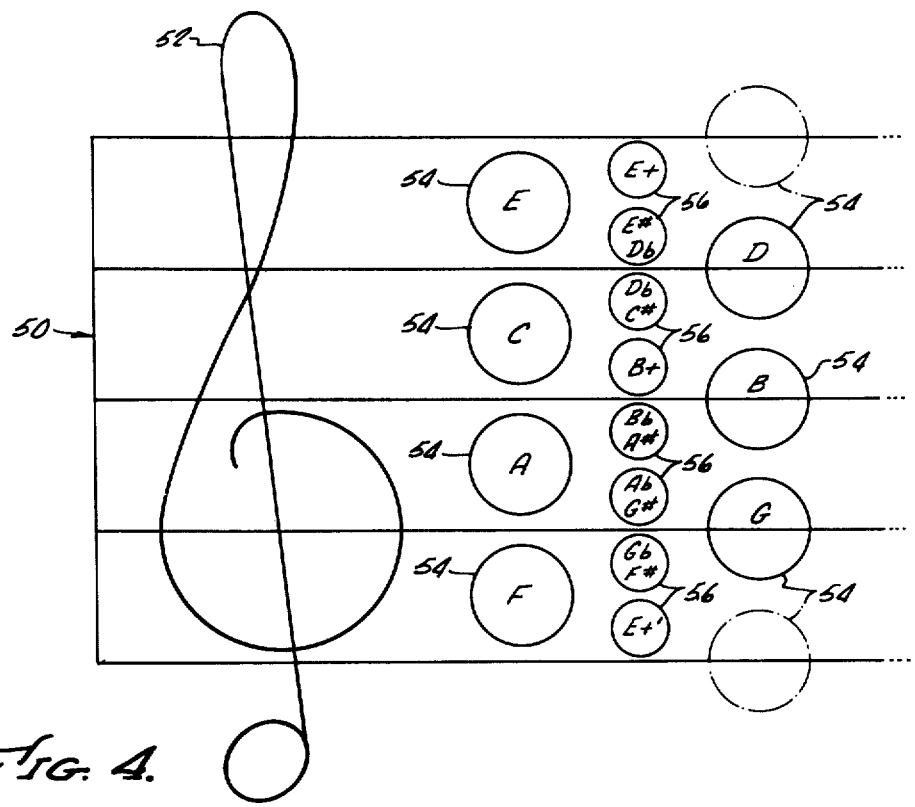
FIG. 4 is a diagrammatic representation of a typical display panel.

FIG. 4 is a showning of a display that may appear on a panel in association with the lamps 42. The display contains a musical staff 50 of five lines and four spaces carrying the G-clef 52 which indicates that the staff 50 is the treble staff, on which it is customary to display the notes E, G, B, D and F on the five lines from bottom to top of the staff and the notes F, A, C, and E on the four intervening spaces.

Apertures or windows 54 on the lines and spaces of the staff are aligned with note indicating lamps 42 (FIG. 1) and the apertures or windows have been designated in FIG. 4 by the note designations of the lines and spaces of the treble staff for the key of C.

The display panel is also provided with smaller windows or apertures 56, aligned vertically between the two vertical alignments of windows or apertures 54 and positioned in pairs in each of the four spaces between the five lines. Behind the small apertures 56 are located those of the lamps 42 that represent sharp or flat notes of the scale corresponding, as previously mentioned, to the black key notes of a keyboard instrument. The arrangement of the large and small apertures 54 and 56 and the lamps located behind them is such that a lamp and its display window representing the sharp of one natural note in the scale and the flat of the next higher natural note appears on a line passing through the centers of the apertures or windows representing the two natural notes in the scale.

Attention is now directed to the fact that in the array of lamps in FIG. 1, a lamp appearing between those representing the notes E and F, and one appearing between the notes B and C, are designated E+ and B+ respectively. It has been set forth hereinbefore that the interval between the notes E and F and between the notes B and C is a semi-tone and accordingly, there is no intervening note. It has also been set forth that when key signatures contain six and seven sharps or flats either note of either of these two pairs of notes may be brought into the musical scale as the sharp or flat of the other. The lamps designated E+ and B+ provide a display for this situation and these two lamps might also be considered as having a designation F− and C−.

FIG. 2 is a schematic showing of one of the sharp-flat insertion switches. The switch is identified by the reference numeral 48 and is a three-pole, three-throw switch. As employed in the circuitry between the lamp driver circuits 32 and the lamps 42, as shown in FIG. 1, the upper and middle switch terminals associated with the upper contactor 48-1 are strapped together for the notes F, A, C and D, but the upper terminal associated with the upper contactor is left unconnected for the other notes namely E, G, and B. The middle and lower switch terminals associated with the lower contactor 48-3 of the switch are strapped together in the switches for the notes F and C only. In all of the switches, the lower terminal associated with the upper swinger 48-1 the upper terminal associated with the lower swinger 48-3 and the middle terminal associated with the middle contactor 48-2 are strapped together.

Referring now to the switch designated F in FIG. 1, it will be noted that the lower, middle and upper contactors 48-3, 48-2 and 48-1 of that switch are connected to the lamp drivers associated with the tone pass filters for the tones E, F and F sharp, respectively, the last mentioned note also having the designation G flat. The switch is set for the "natural" note condition, when the three contactors are engaging their middle terminals. From the middle terminals associated with contactors 48-3, 48-2 and 48-1 of the F switch paths are extended to the E, F and F sharp lamps, the first of these three including the middle contactor 48-2 and associated middle contact of the switch for the note E, the second being a direct connection and the third including the lower contactor 48-3 and middle contact of the switch 48 for the note G.

The path just traced accounts for the lower contactor 48-3 of the switch 48 for the note G. The middle and upper contactors 48-2 and 48-1 of this switch are connected respectively to the lamp driver circuit 32 associated with the filters 30 for the notes G and G sharp (A flat). The middle contact associated with the middle contactor 48-2 of the switch 48 for the note G is connected to the lamp G and the middle contact associated with the upper contactor 48-2 of the switch G is connected to the lower contactor 48-3 of the switch for the note A which has its associated middle contact connected to the lamp for the note G sharp (A flat).

Complete switch connections have been shown, in addition to those already described, for the switches for the notes A, B, C, and D. The switch connection for the switch E duplicate, relative to the lamps E flat, E and E+, those of the switch B for the lamps B flat, B and B+ and have been omitted along with those of the fragmentally shown switch for the note F' at the upper end of the octave.

It will be apparent from the foregoing that when all of the sharp-flat insertion switches are in their "natural" settings the activation of any one of the lamp driver circuits 32 in response to its assigned musical note will result in the lighting of the lamp 42 corresponding to that note. The sharp-flat insertion switches when operated to their sharp positions, which is a movement of the contactors downwardly, or to their flat settings, which is a movement of their contactors upwardly, is to change the routing of paths from lamp driver circuits to lamps.

In order to understand how the insertion of sharps or flats may aid voice or musical instrument trainees, it should be remembered that in musical notation the key signature employing sharps or flats appear only at the beginning of a staff and it is necessary for the reader to remember this and to produce the sharp or flat variation of the note at the time the note is encountered on a line or space of the staff, since the notes as they appear are not individually identified by the sharp or flat symbol.

The utility of the switches may be illustrated by assuming that a student is producing tones being read from music written in the key of G Major which has one sharp, on the note F, in its key signature. The insertion of a sharp on F into the circuitry shown in FIG. 1 is accomplished by moving the three contactors of the F switch down to their lower contacts. All other switches will be left in their natural positions. This results in disconnection of the F sharp lamp from the F sharp lamp driver, and connection of that lamp driver instead to the F lamp. The lamp driver for the note F becomes connected to the E+ lamp, but the E lamp remains connected to the lamp driver for the note E by virtue of the strapping of the middle and lower contactors associated with the lower contactor 48-3 of the switch designated F. As the student produces tones the lights for all of the notes in their natural state will light on the display board in the positions corresponding to those in the music from which the student is reading the notes. When the student reads the notes on the lower space of the staff and providing he remembers to produce the tone F sharp the small lamp on the display panel for the note F sharp will not be lighted, but instead the lamp on the space for the note F will be lighted and this lamp, corresponding in location on the display board to the position of the note that the student has read from the music will indicate to the student that the correct tone has been produced. If instead the student incorrectly produces the tone for the note F natural, the lamp E+ will be lighted as an indication that the student has not remembered to produce the F sharp tone.

The key signature containing two sharps has the second sharp on the note C and for aiding a student reading from music having this key signature, the switches for the notes F and C should both be operated to their sharp position. The switch C in its sharp position, with its contactors moved to their lower contacts changes lamp circuit routings for the notes C sharp, C and B+ corresponding to the changes in routing made by the switches relative to the notes F sharp, and D+.

The key signature containing three sharps has the third sharp on the note G and for assisting a student reading from music having this key signature, the switch G would be operated to its sharp position in addition to those for the notes F and C. At the upper contactor 48-1 of the switch G the path from the lamp driver 32 associated with the G sharp filter is now routed to the lamp 42 for the note G, the G sharp lamp being disconnected. The lamp driver 32 associated with the filter for the note G is routed to the lamp for the note F sharp which was disconnected from the F sharp lamp driver by the F switch. If now, in reading the music and producing tones correctly including F sharp, C sharp and G sharp the lamps corresponding to the positions of the notes F, C and G on the staff will be lighted in response to F sharp, C sharp and G sharp, these being the lamps designated F, C, and G. If instead, the student produces the natural of any one of these notes, the result will be the lighting of a lamp behind one of the small apertures next below the lamp which should have lighted.

Turning now from key signatures employing sharps to key signatures employing flats, the key signature containing one flat has the symbol associated with the note B. The adjust the device for this key signature, which represents the key of F Major, the contactors 48-1, 48-2 and 48-3 of the switch B are moved to their upper position all other switches being left in their natural settings. With the switch B so adjusted, the lamp driver 32 associated with the filter for the note B flat is disconnected from the B flat lamp at the contactor 48-3 and is connected instead to the B lamp. At the middle contactor 48-2 of the switch B the lamp driver 32 for the note B filter is connected to the lamp B+. Correct sounding of the note B flat by the student will result in the lighting of the lamp for the note B at the point on the staff on the display board corresponding to the point from which the student is reading the note. If instead, the student erroneously sounds the note B, the B+ lamp will be lighted. The key signature containing two flats has the second flat associated with the note E and the setting of the switch E to the flat condition will associated the lamp E with the lamp driver for the note E flat and will associate the lamp E+ with the lamp driver for the note E. The key signature containing the third flat has that flat associated with the note A. With the switch A set in its flat insertion position, the contactors being moved upwardly, the path from the lamp driver for the note A flat is traced through the contactor 48-2 and middle contact of the switch G and the lower contactor 48-3 and associated upper contact of the switch A to the lamp A. The path from the lamp driver 32 for the note A is traced through the middle contactor 48-2 and associated upper contact of the switch A to the lamp for the note B flat, which was disconnected at the lower contactor of the switch B, now operated to its flat insertion position. If the student correctly produces the note A flat when reading it, the A lamp will light. If the student incorrectly produces the tone for the note A instead of A flat, the lamp for A sharp (B flat) will light, and this is one of the lamps located behind a small window or aperture. It will be apparent that the objective of the sharp-flat insertion keys is to adjust the device so that for any key signature, the notes properly sounded will cause the lighting of lamps in the locations on the lines and spaces of the staff that the notes actually appear in the music from which the student is reading.

As mentioned hereinbefore, the sixth and seventh sharps in the key signatures of sharps are associated with the notes E and B, which have only semi-tone interval relationships to the notes F and C respectively next above them. Also, as mentioned hereinbefore, the correct response to the reading of E sharp is the sounding of the note F and the correct response to the reading of the note B sharp is the sounding of the note C. The B switch will accordingly be placed in its sharp condition with the contactors moved downwardly only after all of the other switches have been placed in their sharp conditions. With both the C and B switches in their sharp conditions the operating path from the lamp driver 32 associated with the note C is traced through the middle contactor 48-3 and associated lower contact of the switch C, and the upper contactor 48-1 and associated lower contact of the switch B to the lamp B. The lamp C is disconnected at the middle contactor 48-2 of the switch C and a path is extended from the lamp driver 32 associated with the filter for the note B through the lower contactor and lower contact of the switch C and the middle contactor and associated contact of the switch B to the lamp A sharp-B flat. Thus, if the student, in reading B correctly produces the tone for C which is the same as B sharp the lamp driver 32 of the C filter will cause the lighting of the lamp B. If instead, the student produces the note B, the lamp for A sharp-B flat will be lighted instead.

The extreme case in the case of flats is, as previously set forth, the key signatures having 6 and 7 flats in which the flats are associated with the notes C and F respectively. Assuming the student is reading music having a key signature of seven flats, all of the switches would have been set in their flat conditions with their contactors moved upwardly. With the switches in this condition and referring to the switch F, the lamp operating path is traced from the lamp driver 32 associated with the note E through the lower contactor 48-3 of the switch F and its upper contacts to the lamp F, the path from the lamp driver 32 associated with the note F is traced through the middle contactor and its upper contact of the switch F to the lamp F sharp - G flat and the path from the lamp driver associated with the note F sharp - G flat is traced through the upper contactor of the switch F from which path is extended by virtue of the strapping together of the middle and upper contacts to their lower contactors of the switch G and its associated upper contacts to the lamp G. Thus, the production of the tone E, which by virtue of the key signature is now called F flat, will result in the lighting of the lamp F, the production of the tone F will result in the lighting of the lamp G flat-F sharp which is located behind one of the small apertures or windows, and the production of the note G flat will result in the lighting of the G lamp.

There remains for consideration the utility of the transposing multi-path plug-and-jack set 40. It will be supposed that a singer desires to sing a musical composition which is written in the key of C Major and that the composition includes as its highest note the note E above high C, which appears in the fourth space of the treble clef but that the highest note that the singer can effectively sing is B below middle C which is on the third line of the treble staff. The singer must transpose downwardly into another key, but in order to enable him to be guided in doing this by reading from the music written in the key of C Major the bank of lamps must be shifted downwardly by disconnecting and reconnecting the plug-and-jack set 40 a distance equivalent to five semi-tones, so that when the singer produces the tone for B below middle C the lamp for E will be lighted. In the scale of C Major, E is the note called "mi" and C is the note called "do." In transposing downwardly B becomes "mi" for the singer and G becomes "do." Accordingly, the transposition is to the key of G Major which has one sharp on F. With the transposition made so that the C lamp is under the control of the lamp driver circuit 32 associated with the G filter the B lamp will be under the control of the lamp driver 32 associated with the filter for the note F sharp. Following downwardly, the tone E produced by the singer will cause the lighting of the A lamp, the note D will cause the lighting of the G lamp the note C will cause the lighting of the F lamp and as already noted, the note B will cause the lighting of the E lamp. Because the E+ and B+ lamps become associated with lamp driver circuits only when certain of the sharp-flat insertion keys are in the non-natural positions those additional lamps in the bank of lamps introduce no problems in a transposition effected at the plug-and-jack set 40.

Male vocalists usually sing an ocatave below the written musical notation of the melody, and thus the tones produced by them would be passed by filters for notes associated with the bass clef staff. In order that the vocalist need not learn to recognize the notes of that staff, a full octave downward transposition of the lamps relative to the lamp drivers may be made, so that the music, if correctly read and snug, although sung an octave lower, will cause the lighting of lamps on the treble clef display panel, thus matching the written music.

Mention was made previously of instruments that sound in a different key than the key of C. An example of such an instrument, also as previously mentioned, is the B flat clarinet which sounds in the key of B flat when the musician reads from music written in the key of C Major and fingers the instrument as he has been taught for that key. By shifting the lamp bank relative to the lamp drivers 32 so that the lamp C is aligned to be controlled through the B flat filter and its associated lamp driver circuit 32 the playing of the notes of the B flat major scale will result in the lighting of only the lamps behind the larger windows on the display board, which represent the notes on the lines and spaces of the staff thereby informing the instrumentalist that he is correctly reading and playing his sheet music and correctly fingering his instrument.

Let it be supposed instead that a C instrument is to play in unison with B flat clarinet and that the only sheet music for the composition that is available to the two instrumentalists is written in the key of C Major. It will further be supposed that the carinetist will play in his conventional manner from the music, the instrument sounding in B flat. It thus will be necessary for the other instrumentalist to transpose downwardly from the C Major to B flat Major, which is a downward transposition of two semi-tones. By repositioning the plugs and jacks of the transposing plug-and-jack set 40 downwardly two semi-tone steps, to bring the C lamp under the control of the lamp driver 32 associated with the filter 30 for the note B flat the C instrument, played by transposition in the key of B flat, which includes the notes B flat and E flat instead of B natural and E natural, or the transposing instrument, manipulated in the key of C Major without transposition, or both playing together will cause the lighting of the same lamps, and these lamps will be the ones occupying positions on the lines and spaces of the display board.

It will be apparent that use may be made of the transposing plug-and-jack set 40 as an aid to the solution any problems arising in transposing from one key to another. Each step of transposition between the plug-and-jack components of the transposing plug-and-jack set 40 away from a one-for-one relationship between the tone filters 30 and correspondingly designated lamps 42 in the lamp bank brings the filters comprising a different major key into association with the lamps on the lines and spaces of the treble staff on the display panel. All of the seven key signatures containing sharps and all of the seven key signatures containing flats may be achieved by transposition of the lamps 42 relative to the filters and their associated lamp driver circuits 32.

It may be noted that transposition could be accomplished in another way, namely, by rearranging the lamps and their aperatures and having the representation of the musical staff movably positionable with respect to the lamps. With such an arrangement the representation on the panel of a treble clef staff and/or a bass clef staff could be shifted upwardly or downwardly. For example, referring once again to the B flat clarinet, the display panel could be moved downwardly to present the third space on the staff in front of the B flat lamp.

Attention is now directed to the switch comprising the swingers 14 and 20 for selecting either the ramp preamplifier 16 or the wide pass preamplifier 18 for inclusion in the input to the device. With the wide pass preamplifier switched into the input the second and perhaps fourth harmonics of some of the tones, if within the overall range of the device, and if of sufficient amplitude, may pass through filters one or more octaves above the filter of the fundamental and operate two or more of the lamp driver circuits to light two or more of the lamps. Harmonics which are power-of-two multiples of the fundamental fall exactly on octave distances from the fundamentals, whereas odd numbered harmonics and even numbered harmonics which are not power-of-two multiples of the fundamental do not coincide with octave related harmonics of the fundamentals, and in the equal tempered scale the frequencies of notes within an octave generally do not match the frequencies of the odd or the non-octave related even harmonics. However, in some instances the frequency of a harmonic which is not a power-of-two multiple of a fundamental will be sufficiently close to that of an unrelated note that the filter for that note will pass the harmonic.

When the ramp preamplifier is switched into the input circuit instead of the wide pass preamplifier, because it has a rising attenuation with rising frequency, and the energy in the harmonics, being less than the energy in the fundamentals, the harmonics will be suppressed and lamps representing harmonics will not be lighted. Also, if two or more notes are simultaneously impressed on the microphone, all but the lowest may be attenuated to such an extent as to be incapable of activating its lamp driver circuit. The only circumstance in which the lighting of two lamps is likely to occur in response to a signal tone is that the tone is out of tune and has a frequency at or near a mid-point between the frequencies of two successive notes in the chromatic scale. When this occurs the lighting of two adjacent lamps is possible.

It will be apparent that with the device embodying the present invention, direct indication and identification of an unknown tone or note, without any comparison, is achieved. Thus it becomes possible to identify not only individual unknown tones but also the components of chords or other combinations of tones simultaneously sounded. Also it is possible to identify the components of sounds other than purely musical tones, such as for example the pitch and inflection in speech.

Attention is now directed to FIG. 5 for details of the ramp amplifier 16, the saturating amplifier 22 and other components. In FIG. 5 a dotted line rectangle containing the circuitry of the ramp preamplifier has been identified by the reference numeral 16 to correspond to FIG. 1 and a second dotted line rectangle encloses the portion of the circuitry which is the saturated amplifier and this rectangle has been designated by the reference numeral 22 in correspondence with FIG. 1. As shown in FIG. 5 the ramp preamplifier comprises five stages in cascade, the stages being identified by the reference numerals 70, 72, 74, 76 and 78. Each of the five stages of the ramp preamplifier is an audio frequency amplifier which may include one or more discrete transistor components but which preferably is an integrated circuit device providing the desired gain. Each of the five stages has associated with it a feedback network from the output to the input comprised of resistive and capacitive components. In the case of the first stage 70 the feedback network comprises resistor 71 paralleled by a capacitor 73, and it is the purpose of this network to attenuate frequencies above the highest fundamental that the device is required to identify which, as will be set forth hereinafter, will probably be slightly below 1,000 cycles per second. Each of the other four stages has a feedback network from output to input comprised of two parallel branches, one branch comprising a resistor and the other branch comprising a resistor and a capacitor in series. In the case of stage 72 the three components of the feedback paths are identified by the reference numerals 75, 77, and 79 respectively. The values of the components in the feedback networks are selected to give each stage a roll-off of approximately 6 db per octave, so that over the four stages there is a roll-off in the form of increasing attenuation with increasing frequency, of the order of 18 to 24 db per octave. It follows from this that an overtone one octave above a fundamental, and variously designated as a first harmonic or as a second harmonic when the fundamental is considered to be a first harmonic, will be attenuated at least 18 db. An overtone two octaves above the fundamental will be attenuated at least 36 db. The result is that a fundamental impressed upon the input to the ramp preamplifier at the same level as a fundamental an octave below it will appear at the output 19 db below the output level of the lower of the two fundamentals.

The interstage coupling is frequency relative, typified by capacitor 80 and resistor 82 from stage 70 to stage 72, pure resistive, comprising the resistors 84 and 86 from stage 72 to stage 74, reactive from stage 74 to stage 76, and reactive from stage 76 to stage 78. The values of components in the reactive couplings are chosen to attenuate frequencies below the lowest fundamental to be handled by the system.

For utilization in a device for giving visual indication in the human voice range, or the range of notes of the grand staff in musical notation, a frequency range of four octaves is considered to be adequate, including as its lowest note a frequency of 65.41 cycles per second (Hertz) which is the frequency of the note C two octaves below middle C and having as its highest note a frequency in the neighborhood of 1,000 cycles per second, the note that ends the octave which begins with the C next above middle C having a frequency of 987.8 cycles per second. In a particular embodiment of the invention the parameters of the ramp preamplifier are such that the amplitude at the output of the fifth stage, designated 78, will be about the same for the highest frequency as the signals fed into the input of the first stage, designated 70, from a transducer, such as a microphone, and it follows from this that lower notes impressed upon the input at the same amplitude will have a higher amplitude at the output in correspondence with their frequency as determined by the previously mentioned attenuation of ascending frequencies at a minimum of 18 db per octave. In a specific embodiment of the invention, for utilization by the circuitry connected to the output of the ramp preamplifier a minimum output signal of 3 millivolts is adequate and this might be the same as the input from a directly connected microphone.

Whereas, in the diagrammatic showing in FIG. 1, a microphone 10 is connected to the input of the ramp preamplifier 16 through an amplifier 12, jacks 100 and 102 (FIG. 5) are shown connected directly to the input to the ramp preamplifier. A microphone may be connected by a suitable plug through one of the jacks and another source of sound waves, such as a tape player, may be connected through the other jack. FIG. 5 contains no showing of an amplifier corresponding to the amplifier 12 in FIG. 1, it being understood that microphones and reproducers of recorded sound have varying output voltage depending upon their types and that for some purposes no amplification will be needed between the sound source and the input to the ramp amplifier 16 and that if amplification is needed it may be supplied.

Mentioned has been made previously of the fact that the coupling between stages 72 and 74 of the ramp preamplifier is purely resistive, whereas the interstage couplings between all other stages include a capacitor which, of course, offers different impedances to different frequencies. The coupling between stages 72 and 74 comprises a voltage divider which is non-reactive from a frequency standpoint and its purpose is to apply to stage 74 only a fraction of the voltage appearing at the output of stage 72 in order to avoid overloading of the remaining three stages and attendant distortion of signals passing through those stages.

The output of stage 78 of the ramp preamplifier is coupled through resistor 106 to the input of saturated amplifier stage 22 the amplifying component of which is indicated by the conventional triangular symbol 108 for an amplifier and this may be an integrated circuit component. The bias on the amplifier component 108 is adusted so that the amplifier will operate between saturation and cutoff at the highest frequency that the set of tone indentifying filters is intended to recognize and it has been mentioned previously that the output of the last stage of the ramp preamplifier 16 may be of the order of 3 millivolts for that frequency. It follows from this that the output of the saturated amplifier 22 will be a square wave for all signals impressed upon the input of the ramp preamplifier 16. Because of the attenuation characteristics of the ramp preamplifier as set forth hereinbefore, namely that it attenuates frequencies on an ascending basis at a roll-off rate of at least 18 db per octave the lowest of any two or more frequencies impressed upon the input to the ramp amplifier at the same time, whether they are two or more fundamentals, a fundamental and one or more harmonics or more than one fundamental with its harmonics, the lowest frequency passing through the ramp preamplifier will have the greatest amplitude at the output of that amplifier. Even though the harmonics may at the input exceed in amplitude the fundamental, which is a situation that may occur in the case of certain types of musical instruments and is likely to occur in the case of sung musical notes or speech, the roll-off of the ramp preamplifier will provide for predominance of the fundamental at the output of the ramp preamplifier from the standpoint of amplitude. If, as is also probable, a fundamental and one or more harmonics should combine to produce a resultant wave, the resultant will cross the zero axis of the wave at the same rate as the fundamental so that its envelope will have a configuration corresponding to the frequency of the lowest note passing through the ramp amplifier. With the saturated amplifier 22 operating between saturation and cut off it will conduct while the wave impressed upon it by the ramp preamplifier has one algebraic sign and will cut off while the wave has the other algebraic sign, with the result that the output of the saturated amplifier will be a square wave at the frequency of the lowest sinusoidal wave impressed upon the input of the ramp preamplifier.

The output of the saturated amplifier 22 is connected to a common-emitter transistor amplifier stage 120 which has connected across its base-emitter junction a diode 122 poled oppositely relative to the polarity of the normal biasing potential for that junction in the type of transistor indicated, namely an NPN transistor. The diode 122 limits the reverse bias potential that can develop across the base-emitter junction of the transistor.

The output of the transistor stage 120 is connected through a resistor 124 to one of the terminals of a single-pole double-throw switch 126 mounted on control panel 104. The output of the transistor 120 is also connected to the input of a frequency divider 128, the output of which is connected through a resistor 130 to the other terminal of the switch 126. The frequency divider 128 may be an integrated circuit device and in essence it comprises a bistable flip-flop that may be switched from one stable condition to the other only in response to input transitions of one polarity. Thus it changes from one stable state to the other only in response to alternate transitions in a square wave applied to its input, so that its output is a square wave at half the frequency of the input. The reason for the provision of the frequency divider will be described following completion of the description of FIG. 5.

The swinger or contactor of the single-pole switch 126 is connected to the input of a common-emitter amplifier stage comprising the transistor 134 which has its collector connected for base-collector biasing purposes through a resistor 136 and the collector-emitter junction of a transistor 138 to a voltage source at positive polarity. For output purposes the collector of the transistor 134 is connected to the inputs to the several frequency pass filters 30 in FIG. 1 and the connection between the output electrode of the transistor 134 and the filters 30 may be considered as including the swinger and upper contact of the single-pole double-throw switch 20 in FIG. 1. With the circuit shown in FIG. 5, the frequencies appearing at the output of the saturated amplifier 22 will be impressed on the filters 30 if the contactor of switch 126 is engaging its right-hand contact, thus bypassing the frequency divider 128, and tones at one half the frequencies emitted by the saturated amplifier 22 will be impressed upon the filters 30 if the contactor of switch 126 engages its left-hand contact, which is connected to the output of the frequency divider 128.

Returning to consideration of the transistor 138 its base is connected to the contactor of a potential divider 144 for supplying a potential positive with respect to ground to the base of the transistor 138. The potential divider 144 is located on the control panel 104. Its function is to control through the transistor 138 the biasing potential on the collector of the transistor 134 and thus to control the gain of the transistor 134. Thus, the potential divider 144 and the transistor 138 cooperatively serve as a gain control for the transistor 134 but in actuality they serve as a bandwidth control for the filters 30 will be described hereinafter.

Consideration will now be given to the utility of the frequency divider and the arrangement for bypassing it in a device as represented in FIG. 5. It will be remembered that mention has been made previously of providing for the recognition of frequencies in a range of four octaves, beginning at the low end at slightly about 62 cycles approximately and ending just below 1,000 cycles approximately. Four octaves of the chromatic scale involves a total of 48 discrete tones which, on a basis of direct routing of tones from the saturated amplifier 22 to the filters 30 would require a total of 48 filters. However, tones in the three octaves from approximately 125 to approximately 1,000 may, by passing them through the frequency divider, be recognized by three octaves of filters tuned from approximately 62 cycles per second to approximately 500 cycles per second. It would be appropriate to identify each filter on the display panel by a designation one octave above it, so that the designations of the notes on the display panel would correspond with the frequencies impressed on the input to the ramp preamplifier but passed through the frequency divider. Then, in order to provide for identification of tones below 125 cycles the switch 126 on the control panel 104 would be operated to the position to bypass the frequency divider 128. Tones below 125 cycles and other tones up to 500 cycles would be identified by the set of 36 filters required to cover three octaves and it would be understood by the user of the device that with the switch in this position each lamp designation on the display panel would be one octave higher than the note actually causing the lighting of the lamp. With this arrangement, four octaves of notes may be identified individually using three octaves of filters. It will be understood that the frequency range hereinbefore suggested is merely illustrative of the principles involved, and the device is adaptable to any portions of the audible sound spectrum.

Reference was made previously to the fact that potentiometer 144, while serving as a gain control for the saturated amplifier stage 134, actually serves as a bandwidth control for the filters 30. In order to explain this, attention is directed to FIG. 6 which is a family of curves of typical frequency response of a filter at different input levels. In FIG. 6 output levels are plotted along the vertical axis and frequency is plotted along the horizontal axis. The curves representing output levels for the different input levels are generally symmetrical about a line $f_0$ which is the midpoint of the pass band of the filter, and the output level is generally a maximum at that frequency. It will be observed that at higher input levels, which produce higher maximum output levels at the mid-frequency, the output level curves begin to rise earlier and fall away later in the ascending sound frequency spectrum.

The line $V_1$ represents a predetermined output level crossing all of the response curves. It will be noted that response curve $R_1$ which is the lowest of the three in terms of maximum output intersects response curve $R_1$ at frequency $f_1$ below $f_0$ and at $f_1$ , above $f_0$. Response curve $R_2$ intersects the output level line $V_1$ at frequency $f_2$ which is below frequency $f_1$ and at frequency $f_2$ , which is above frequency $f_1$ , . Response curve $R_3$ intersects output level line $V_1$ at $f_3$ which is below $f_2$ and at $f_3$ , which is above $f_2$ , . Thus at output level $V_1$ an input level that gives an output response curve $R_1$ has a pass band from $f_1$ to $f_1$ , , an input level that provides the response curve $R_2$ has a pass band $f_2$ to $f_2$ , and the input level that provides the response curve $R_3$ has a pass band from $f_3$ to $f_3$ , .

The lamp driver stage comprising the transistor 34 may be biased to have a threshold or a trigger level below which the lamp shows no illumination, with the lamp beginning to glow dimly at the threshold level and coming to full brightness at a somewhat higher input than the threshold level but preferably appreciably before $f_0$ is reached. $V_1$ in FIG. 6 may be considered as representing the threshold input potential for the lamp drivers. With the gain control 144 for the saturated amplifier set at a level corresponding to the response curve $R_1$ the lamp associated with a filter will show illumination at $f_1$ and the lamp will show illumination in the band between the frequencies $f_1$ and $f_1$ , . If the gain of the saturated amplifier is increased to a level which will produce the response curve $R_2$ the lamp will be illuminated in response to any frequency in the band between frequencies $f_2$ and $f_2$ , . A still further increase in the output of the saturated amplifier will provide for illumination of the lamp between a still wider band of frequencies such as represented by the band between frequency $f_3$ and $f_3$ .

The variable bandwidth feature has utility particularly in the training of beginning voice students who have difficulty in producing with accuracy various musical tones. With a wide bandwidth adjustment of the apparatus the student can discover even with an inaccurately produced tone that he is off but near the desired tone and he can easily discover that he needs to pitch higher or lower in order to reach the tone. As the student becomes more experienced the bandwidth may be reduced by reducing the gain of the saturated amplifier so that the system will tell him at once whether he is on or nearly on the correct pitch.

With the saturated amplifier and the bandwidth control, the operation of the lamps is entirely dependent upon what frequency is being played or sung into the microphone and not how loudly the person is playing or singing. The bandwidth control can be set so that two lights will come on if the student is playing or singing a note that is halfway between the frequencies represented by the two lamps. It may also be adjusted by cutting back the gain of the saturated amplifier so that neither of two lamps will show illumination until the student has produced a tone that is close to the one represented by a lamp that lights. This forces the student to learn to produce the notes precisely and if he is very far off in either direction from the desired frequency no lamps will be lighted.

Figure 7:
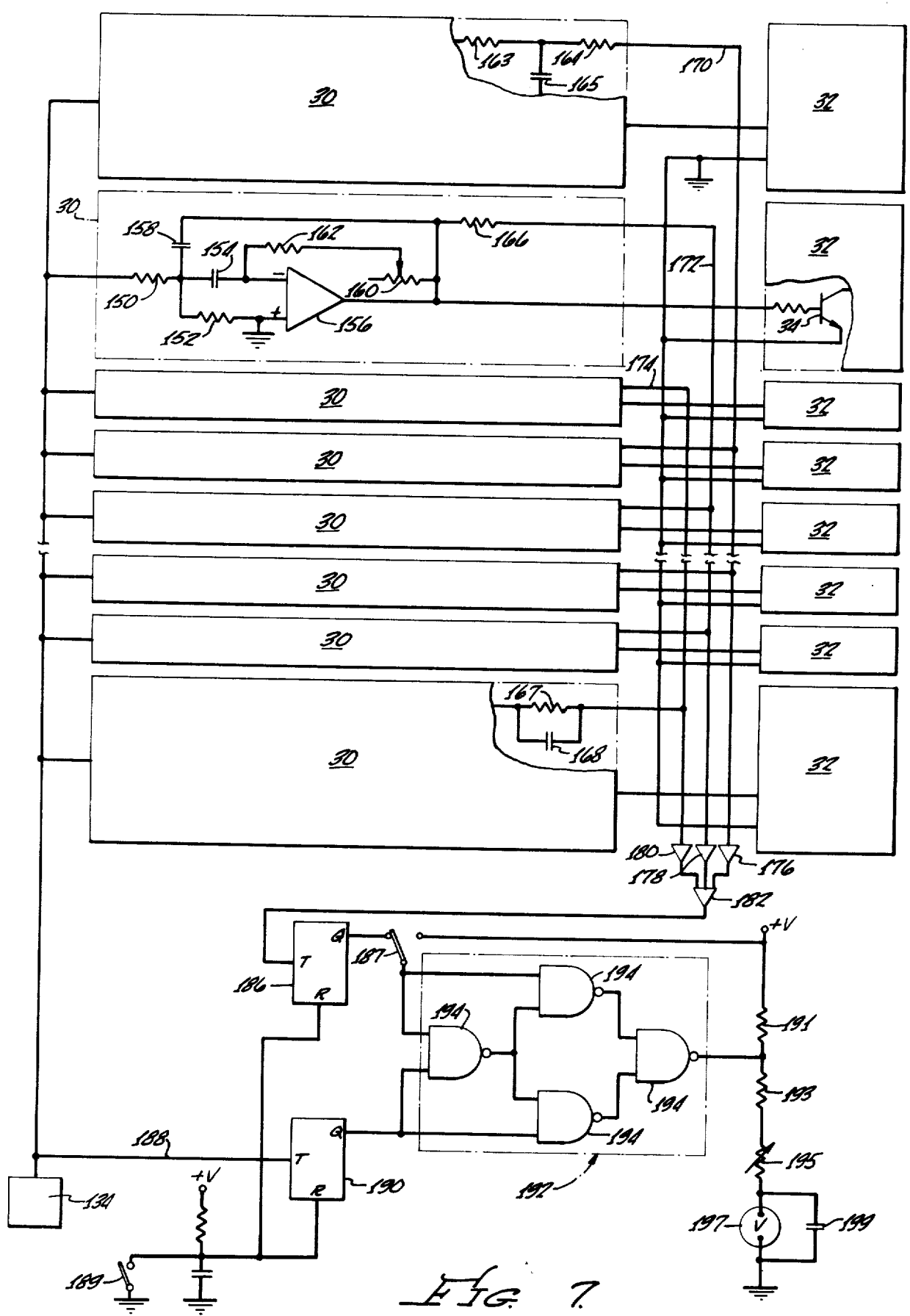
FIG. 7 is a schematic circuit diagram showing a typical filter employed in the tone identifier and a phase detector for monitoring the filters.

FIG. 7 shows typical circuitry for the filters, which are indicated in FIG. 1 without circuitry by the reference numeral 30 and by designations of frequencies of slightly more than one chromatic octave, occupying in musical notation the lines and spaces of the treble staff. Reference was made hereinbefore to a published article describing the design of active band pass filters. A filter configuration that is shown therein, and is called a multiple feedback band pass filter is shown in typical form in FIG. 6. The multiple feedback active band pass filter has been enclosed in a dotted line rectangle in FIG. 7 to which the reference numeral 30 has been applied. The inputs of all of the filters 30 may be connected directly, as shown in detail in FIG. 5, to the circuitry associated with the output of the saturated amplifier 22, or through the switch 20 shown in FIG. 1. In the schematic showing in FIG. 7 the filter input includes a voltage divider comprising resistors 150 and 152. From the junction of these resistors the output signals from the bandwidth control transistor 134 in FIG. 5 are applied through capacitor 154 to the input of an audio amplifier contained in an integrated circuit component represented conventionally by a triangle designated by the reference numeral 156. The output of each filter is connected to a lamp driver circuit individual to the filter, the lamp driver circuit being shown in FIG. 3 of the drawings and the transistor 34 of that circuit being also shown in FIG. 6.

Feedback is taken from the output of the filter 30 in two paths, one being resistive only and feeding back directly to the input of the amplifier 156 and the other being capacitive only and being applied to the input to the amplifier 156 ahead of the capacitor 154, namely at the junction of that capacitor with the dividing point of the signal attenuating potential divider comprised of the resistors 150 and 152. The capacitive branch of the feedback contains the capacitor 158. The resistive branch includes a variable resistor 160 and a fixed resistor 162 in series. With the circuitry shown in FIG. 7, filters having high Q and capable of responding individually to the tones of the chromatic scale may be produced inexpensively and in compact form. In an embodiment of the invention having filters employing the circuitry shown in FIG. 7 the filters have a Q of approximately 35.

FIG. 7 includes a schematic circuit diagram of an arrangement for indicating visually by means of a meter the percentage deviation, if any, from the nominal or peak frequency of the filter of a tone being passed through any of the filters. It is operative upon the principle that the output wave of any of the filters, when the filter is passing the exact frequency to which it is tuned has a phase difference relative to the input wave of 180°. If the phase difference is less than 180°, the tone passed by the filter is flat relative to its peak frequency whereas if the phase difference exceeds 180° the tone passed by the filter is sharp relative to the peak frequency of the filter.

The circuit that controls a meter to indicate deviation of the tone from correspondence with the peak frequency of the filter is a phase detector. As indicated in FIG. 7 an output is taken from each filter, in addition to the output to the lamp driver circuit, to one of three conductors designated by the reference numerals 170, 172 and 174. In the scale succession of filters, whether diatonic or chromatic, the filters are connected to the three conductors 170, 172 and 174 in rotation so that adjacent filters in the frequency spectrum shall not be connected to the same output lead.

Conductors 170, 172 and 174 extend to the inputs of amplifiers 176, 178 and 180, respectively, and the outputs of these three amplifiers are connected in parallel to the input of an amplifier 182. The output of the amplifier 182 is connected to the triggering input of a bistable flip-flop 186. The input bus for all of the filters is connected by a conductor 188 to the triggering input of a bistable flip-flop 190.

Each of the bistable flip-flops 186 and 190 is arranged to switch back and forth between it two states in response to like input transitions. Thus, it functions as a frequency divider. The outputs of the two flip-flops 186 and 190 are connected to an exclusive OR gate designated generally by the reference numeral 192 and consisting of four NAND gates 194. The truth table for the exclusive OR gate may be expressed in the terms that when the inputs to the gate 192, which are the outputs from the flip-flops 186 and 190, are alike, whether it be binary 0 or binary 1, the output of the gate will be binary 0. Conversely, when either input to the gate is binary 0 and the other is binary 1 the output of the gate will be binary 1.

The output of the exclusive OR gate 192 is connected to the junction of resistors 191 and 193 which are part of a series circuit between a voltage source and ground, this series circuit including variable resistor 195 and meter 197, the meter being shunted by an integrating capacitor 199.

The variable resistor 195 serves as part of a multiplier for the meter 197 and with the output of the OR gate set in the binary 0 condition the variable resistor 195 may be adjusted to set the meter at a predetermined reading such as mid scale. When a tone matching the peak setting of a filter is passed through the filter, the input wave will be impressed upon the flip-flop 190 and the output wave will be impressed upon the flip-flop 186 and because of the 180° phase difference between the two waves the output of the OR gate will switch back and forth between binary 0 and binary 1 at a uniform rate. The capacitor 199 will absorb the voltage swings at the output of the OR gate and the meter 197 will maintain a steady deflection. Conversely, if a wave which is of a different frequency than the resonant frequency of one of the filters passes through that filter, there will be a phase difference between the waves applied to the inputs to the flip-flops 186 and 190. This phase difference will cause the output of the OR gate to spring back and forth between binary 0 and binary 1 at unequal rates or intervals and the meter 197 will be deflected from its steady state position. The scale of the meter may be calibrated in percentage of phase difference between the input and the output waves to the filter which will indicate the percentage deviation of the tone from the resonant frequency of the filter. The circuit shown in FIG. 6 will reveal very small percentage deviations of tones and thus will indicate to the person using the device deviations that would not be indicated by the lighted lamp associated with the filter.

Reset terminals for the flip-flops 186 and 190 are connectable to ground through a switch 189 which may be closed momentarily for the purpose of setting the two flip-flop circuits to like output conditions and the inputs to the OR gate 192 are connectable to a reset potential through a switch 187 to set the two inputs to the OR gate in the same condition. The switches 187 and 189 may, if desired, be ganged to comprise a double-pole double-throw switch.

Attention is directed to the resistors 163 and 164, in series, connecting to one of the amplifiers 170, 172 and 174 the output of the filter 30 that is tuned to the highest frequency with capacitor 165 connected from the junction of the resistors to ground, to the resistor 166 connecting to one of those amplifiers the output of the filter 30 that is shown in detail in FIG. 7, and which is representative of any except the highest and lowest frequency filters; and to the resistor 167 shunted by capacitor 168 connecting to one of the three amplifiers the output of the filter 30 that is tuned to the lowest frequency. The capacitor 165 in combination with the resistor 163, and the capacitor 168 in combination with the resistor 167 provide compensation for the lack of filters tuned to higher and lower frequencies. The filters between the highest and lowest require no such compensation.

The sound identifying device hereinbefore described is usable in various ways for teaching purposes. The, simplest of course, is to have a student sing or play a musical instrument into the microphone and observe the lighting of lamps as the tones are produced. In the case of a musical instrument the student learns the fingering or other method of producing the various tones and determines by observing the lighting of the lamps, whether or not he is actually producing the intended tones. In the case of the vocalist it is a matter of learning, by hearing his own voice, to produce tones corresponding to those of the musical scale. In either case, the training may also involve sight reading of music in the production of tones to correspond with the musical notations.

A system has been devised involving the use of supplementary aids including lesson material, a tape deck at least capable of playing prerecorded tape, and in addition a set of headphones. FIG. 8 shows a schematic circuit for associating the supplementary components with the tone identifying device. In FIG. 8 the microphone jack 100, which appears on the control panel 104 as in FIG. 5, is connected over a conductor 200 which appears only as a stub in FIG. 5, to the input of an amplifier stage 202. The output of the amplifier stage 202 is connected through a variable resistor 204 serving as a volume control, and through a resistor 206 to an amplifier stage 208. The output of the amplifier stage 208 is amplified by transistors 210 and 212 and the output of transistor 212 is connected to a jack 214 into which a pair of headphones may be plugged. The purpose in providing a pair of headphones is that the student shall hear the tone vocally produced by him through the set of headphones rather than directly from mouth to ear through the air. Since the jack 100 is connected to the input of the tone identifier as shown in FIG. 5, the tone identifier will operate to display visually to the student the identification of the tone that he has produced.

For the purpose of providing lesson material, a tape player (not shown), which may be a reel-to-reel deck or a cassette device, and arranged either to reproduce only or to record as well as reproduce, provided with a tape containing lesson instructions, may be plugged into the jack 220. This jack is connected to the input of an amplifier stage 222 and the output of this stage is connected to a variable resistor 224 serving as a volume control. The volume control 224 is connected through a resistor 226 to the input to amplifier stage 208 in parallel with the microphone path, and thus the student will hear in the headphones the instructions which comprise the lesson, and which may be entirely verbal or may include tones that the student is to imitate. The tape may contain appropriate silent intervals during which the student responds to the instructions by singing into the microphone or performing any other acts as directed. It is also contemplated that there may be provided printed lesson material to be viewed by the student as he listens to the recorded instructions and acts upon the directions contained in the tape, the printed lesson material containing such related visual material as music staffs whereon appear in their proper places the notes that the student is instructed to sing.

A further possibility in connection with the teaching procedure hereinbefore described is the provision of a tape playing machine generally of the type called a stereo player, and having on the tape two tracks, one containing instructions and tonal material that the student is to hear in the headphone set. The other contains tonal material to be impressed upon the input to the sound identifying device. The track that contains the material that is to be impressed upon the tape identifying device may have its output connected to the jack 102 in FIG. 5 which, as previously described is an alternate input to the ramp preamplifier.

It may under certain circumstances be desirable to record an entire lesson period, including all of the instructions to the student as well as his responses. For that purpose an output is taken from the amplifier stage 208, paralleling the output that goes to the transistor 210, to a volume control 230. The volume control feeds signals to a jack 232 and there may be plugged into this jack a tape recorder, either reel-to-reel or a cassette recorder, which would be in operation during the lesson to record it in its entirety, so that the student may later, and if desired, repetitiously listen to his performance in the teaching period.

A system such as that depicted in FIG. 8, employing the tone identifier unit with the supplementary units comprising a head set and a tape player may be employed for speech analysis and for the correction of speech defects as well as for sung or played musical tones. It may be used to diagnose vocal disorders and test total pitch range and intensity levels, to improve and correct pitch and intensity levels, to aid in the training of persons with impaired hearing, to develop full use of pitch range, and to learn intonational patterns. In addition to usage by therapists in the treatment of patients having speech problems, the system may be used by public speakers and actors to discover and correct undesirable speech habits. Since, with the ramp preamplifier included in the sound identifying unit, only fundamentals of speech tones are indicated by the set of lamps, the device may be used as a guide for pitching speech in desired areas of the sound spectrum. In the usage of the system for therapeutic purposes the tapes to which the patient listens for training purposes may contain the sounds and words which the patient is instructed to imitate, thereby enabling him to overcome speed difficulties.

It will be apparent that interchangeable display panels may be provided for association with the device, each arranged to supply tone identification information in accordance with special requirements. It will also be apparent that the device may encompass a range of one or more octaves or fractions thereof or that it may be arranged to identify tones which are not in sequence of either diatonic or chromatic scale. For example the device may be provided with six filters tuned to the frequencies of guitar strings and having associated lamp drivers and lamps to provide a device for the sole purpose of tuning guitars. Such a device may also have, or have instead, filters tuned to the frequencies to which the strings of all the instruments in the violin family are tuned. A device in accordance with the present invention might have a sufficient range of tone channels to enable the tuning of electronic instruments such as electronic organs.

For usage in connection with some types of musical devices, as for example in the tuning of the strings of an electric guitar or in tuning the tone generators of an electronic organ it may be desirable to establish a direct connection between the output circuitry of the electronic instrument and the bank of tone generation filters of the tone identifying device, rather than to go through the double conversion of electrical waves to sound waves and the reconversion of the sound waves to electrical waves through a loud speaking transducer feeding into the microphone 10. As shown in FIG. 1, there may be provided an input terminal 24 for connection to the output of any type of electronic musical instrument, including a tape player or a disc record player, the alternate input terminal being connected by a conductor 26 to the inputs of all of the tone filters, corresponding to the connection of the amplifier 22 to the inputs of those tone filters.

What is claimed is:

1. A device for identifying sound waves having different frequencies which comprises:
   sound wave responsive means;
   means comprising filters for separating waves of different frequencies appearing at the output of the sound wave responsive means;
   means activated by said wave separating means for individually and visually identifying the sound waves; and
   means for indicating relative conformity of said waves with the center frequency of the filters by comparing the phase of said waves at the input and output of said filters.

2. A device in accordance with claim 1 wherein the phase comparing means comprising digital logic components.

3. A device in accordance with claim 1 wherein the phase comparing means comprises:
   means for producing a square wave derived from the input of the filter and a square wave derived from the output of the filter;
   an exclusive OR gate for combining the two square waves to produce a single output wave; and
   means for interpreting the output wave of the OR gate.

* * * * *